US007559147B2

(12) United States Patent
Fleeman

(10) Patent No.: US 7,559,147 B2
(45) Date of Patent: Jul. 14, 2009

(54) PORTABLE WALL FRAMING FIXTURE AND METHOD

(76) Inventor: Timothy Fleeman, 11258 Scott St., Dexter, MO (US) 63841

(*) Notice: Subject to any disclaimer, the term of this patent is extended or adjusted under 35 U.S.C. 154(b) by 725 days.

(21) Appl. No.: 10/956,956

(22) Filed: Oct. 1, 2004

(65) Prior Publication Data

US 2009/0094836 A1 Apr. 16, 2009

(51) Int. Cl.
*B21D 47/00* (2006.01)
*B21K 23/00* (2006.01)
*B23P 21/00* (2006.01)

(52) U.S. Cl. .............................. 29/897.31; 29/897.312; 29/897.32; 29/464; 29/559; 29/281.1; 29/281.4; 29/281.5; 227/152; 269/37; 269/54.4; 269/297; 269/910

(58) Field of Classification Search ................... 29/897, 29/897.31, 897.312, 897.35, 464, 559, 799, 29/281.1, 281.3, 281.4, 281.5; 227/101, 227/152; 269/37, 54.4, 54.5, 297, 304, 310
See application file for complete search history.

(56) References Cited

U.S. PATENT DOCUMENTS 2,662,565 A 12/1953 Le Vay
2,884,967 A 5/1959 Le Vay
3,629,931 A 12/1971 Stanley
3,711,007 A 1/1973 Fry
3,765,587 A 10/1973 Davis
3,873,015 A 3/1975 Whitaker
3,933,348 A 1/1976 Tidwell, Jr.
4,039,112 A 8/1977 Schultz et al.
4,133,097 A 1/1979 Slade
4,154,436 A * 5/1979 Sellers ........................ 269/14
4,174,061 A 11/1979 McDonald
4,304,046 A * 12/1981 McDonald .................. 29/798
4,305,538 A 12/1981 Schultz et al.
4,403,724 A 9/1983 Bardenstein
4,567,821 A * 2/1986 McDonald .................. 100/100
4,629,171 A 12/1986 Judy et al.
4,876,787 A 10/1989 Ditty et al.
5,414,918 A 5/1995 Pearson

* cited by examiner

*Primary Examiner*—Jermie E Cozart
(74) *Attorney, Agent, or Firm*—Douglas E. Warren

(57) ABSTRACT

The present invention relates to a portable framing fixture for fabricating wall frames. Pneumatically controlled clamping mechanisms retain and locate various components of a frame wall. Spring loaded locator pins allow for variations in openings in the frame wall and allow for various frame wall designs. An offloading system allows for removal of completed frame walls from the portable framing fixture. The portable framing fixture is mounted onto a wheeled axle assembly to allow for easy transportation of the portable framing fixture to different job sites.

38 Claims, 12 Drawing Sheets

PORTABLE WALL FRAMING FIXTURE AND METHOD

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

In the construction of frame buildings, it is very important that frame walls be constructed such that the components of the frame wall are square. The top framing members should be parallel to the bottom framing members, and the vertical framing members must be perpendicular to the top and bottom framing members. Additionally, openings for window, doors, and other inserted components within the frame wall must be located properly, and the framing components for those openings must be square with the other framing components. Although these framing requirements are common knowledge in the construction industry, it is impractical to design and construct framing jigs for each type and variation of frame wall. Additionally, such a framing jig would not be easily transportable.

To solve this problem, there have been several attempts to invent a device that ensures that frame walls are constructed squarely, that would allow for variations in the design of the frame wall being fabricated, and would be transportable from job site to job site. However, all of these attempts suffer from one of more deficiencies.

Examples of variations for framing fixtures can be found in a number of patents. U.S. Pat. No. 4,154,436 discloses a wall component fabricating jig for building components. The jig includes a wheeled dolly that makes the jig portable. A frame is included that holds the upper and lower longitudinal plate and sill in position. Other holders are positioned on the frame to locate and hold vertical stud members. The clamping mechanism allows for fabrication of walls that vary in height from eight to ten feet. The frame includes a clamping ability that clamps the upper plate and the lower sill against the vertical studs until the frame assembly has been nailed together. After assembly, the wood frame assembly is lifted from the jig by two conveyors and the wood frame assembly is rolled off the jig. All clamping and adjusting parts are controlled by pneumatic devices. However, the device does not include spring loaded vertical stud locators and the clamping operation does not include a rack and pinion assembly for more precise clamping.

U.S. Pat. No. 3,711,007 also discloses a building wall section fabricating machine for fabricating the wall of a building. The jig includes a set of wheels that allow the device to be portable. Longitudinal wood sills and plates are placed in position on the jig, followed by the placement of vertical wall studs using stud placement saddle units. The jig includes several adjustment screws that allow the frame to be adjusted for fabricating walls of varying heights. However, as before, the device does not include any clamping mechanism or spring loaded vertical stud locator pins. Additionally, the assembled wood frame section is removed by a hoist because the jig does not include any devices that allow the assembled wood frame section to be off-loaded from the jig. The device has no rack and pinion assembly for clamping.

The device in U.S. Pat. No. 3,629,931 discloses an apparatus for nailing a structural frame. The device includes a set of axle-mounted wheels that allows the device to be portable. Longitudinal plates and sills are placed on the jig and vertical studs are interspersed between, the studs being located by a series of brackets consisting of two vertical plates. However, there is no adjustment for fabricating wood frame walls of different vertical heights. There are also no spring loaded pins for locating the vertical studs, and there is no apparent clamping capability or rack and pinion assembly for clamping.

Finally, the device in U.S. Pat. No. 3,933,348 discloses a wall framer for use in assembling wall frames. Although the device is intended to be portable, it does not include wheels or axles. Instead, the device is generally collapsible and is transported by a truck or other vehicle. The device does not appear to be capable of adjustment for varying heights of wall frame assemblies. Longitudinal plates and sills are placed on the jig and vertical studs are interspersed between. Although, the vertical studs are located using spring loaded pins, there is no clamping capability to compress the wood frame components together during assembly and there is no rack and pinion assembly.

While all of the above inventions are intended to provide an adjustable, transportable wall framing fixture, all of these devices have at least one significant deficiency that prevents those devices from solving all of the problems with such fixtures.

SUMMARY OF THE INVENTION

The present invention overcomes these and other problems by providing a wall framing fixture that is portable, that can accept a wide variety of variations in the design of the wall being framed, and that ensures all of the components of the frame wall are square.

More specifically, the present invention resides in a fixture that includes a rack and pinion unit for evenly and precisely clamping the frame wall components for assembly. A number of spring loaded pins in the fixture allow for uneven and special location of the vertical studs within the frame wall and thus, accommodate various frame wall designs that have different sizes and placements of windows, doorways, and other special openings. Once the frame wall is fabricated, it is easily removed from the fixture by devices that lift the frame wall from the fixture and place the frame wall on a series of rollers that allow the fabricator to roll the completed frame wall off of the fixture. The entire portable framing fixture includes a towing tongue and is mounted on a wheeled axle assembly for ease in transportation.

Additional features of the present invention will be in part apparent and in part pointed out hereinafter.

BRIEF DESCRIPTION OF THE SEVERAL VIEWS OF THE DRAWINGS

In the drawings, wherein like numerals and letters refer to like parts wherever they occur.

Corresponding reference characters indicate corresponding parts throughout the several views of the drawings.

While one embodiment of the present invention is illustrated in the above referenced drawings and in the following description, it is understood that the embodiment shown is merely for purpose of illustration and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION

Figure 1:
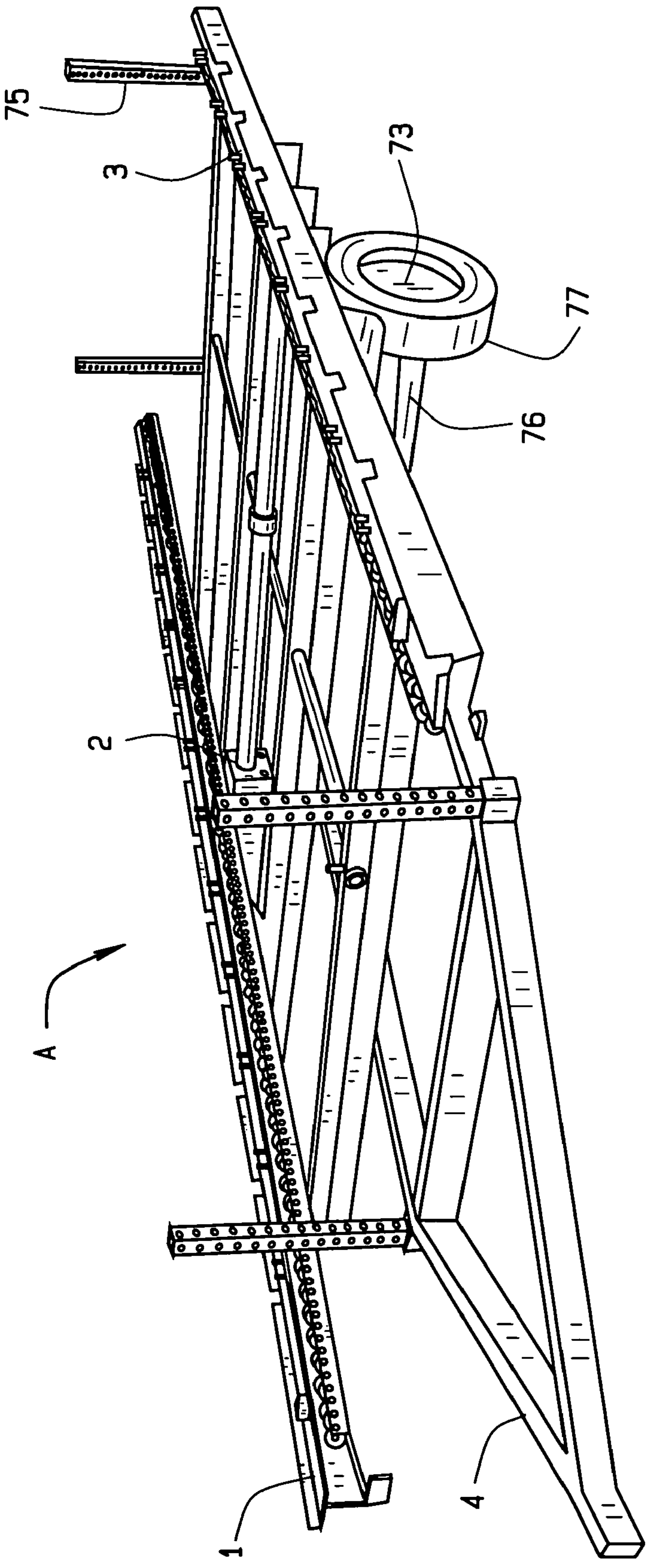
FIG. 1 is a front perspective view of one embodiment of the present invention.

Referring now to FIG. 1, a portable wall framing fixture A is shown. The portable wall framing fixture A includes a locating system 1 for a set of wall framing components, a clamping system 2 that clamps the set of wall framing components, an offloading system 3 for allowing a completed frame wall B to be removed from the portable framing fixture A, and a trailer system 4 for transporting the portable wall framing fixture A between job sites.

Figure 10:
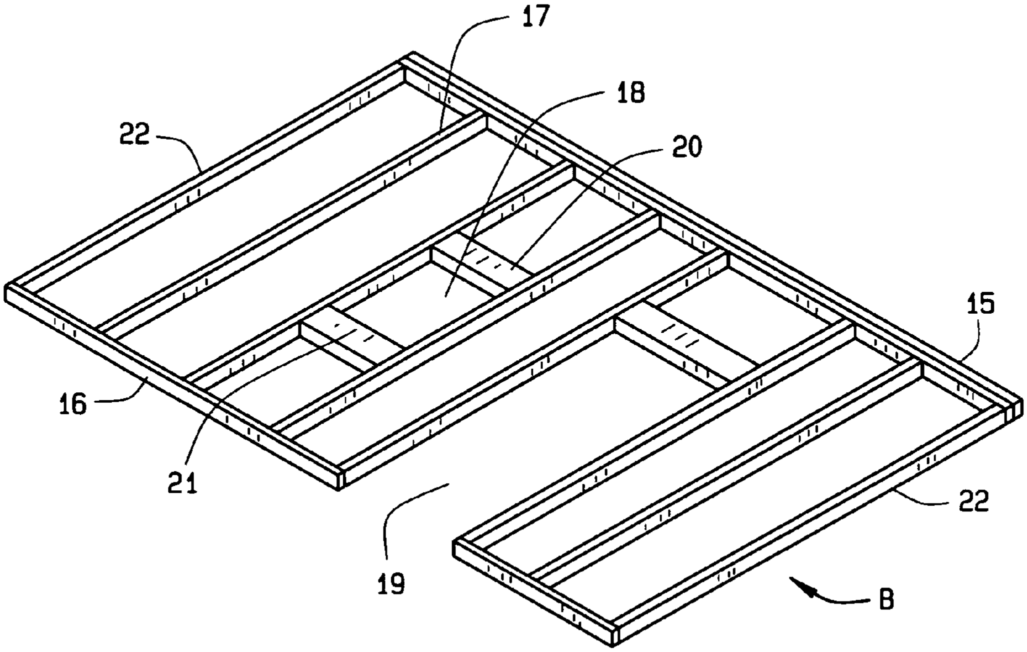
FIG. 10 is a perspective view showing one type of frame wall that can be constructed from wood components using the present invention.

FIG. 10 shows the typical wood frame wall B that might be constructed using the portable framing fixture A. The frame wall B shown herein is made from wood components and is only one example of the type of wall frame construction materials with which the present invention may be used. Thus, while the frame wall B shown herein is made from wood components, this is just one embodiment of the present invention and the present invention may also be used generally to assist in the assembling of other wall frame components made from other types of materials such as, for example, metal or plastic wall framing components.

The wood frame wall B example shown herein includes two upper wood frame plates 15, a lower wood frame plate 16, and a plurality of vertical wood frame studs 17. Where an end of the wood frame wall B is a point where two wood frame walls meet at a corner, a corner vertical stud 22 is included as part of the wood wall frame B. Where window openings 18 or door openings 19 are located in the wood frame wall B, headers 20 and footers 21 are installed as shown. The entire wood frame wall B is generally assembled by nailing the components together. It is the general practice in wood frame construction to drive the nails through the two upper wood frame plates 15 and the lower wood frame plate 16, and into the ends of the vertical wood studs 17. Additionally, the vertical wood studs 17 are usually toe-nailed into the two upper wood frame plates 15 and the lower wood frame plate 16.

The locating system 1 (FIG. 2) includes a first framing jig 5 and a second framing jig 6. It is understood that the second framing jig 6 includes all of the components of the first framing jig 5 with the exception that the second framing jig 6 and its components are a mirror image of the first framing jig 6 and its components. The first framing jig 5 and the second framing jig 6 are spaced a part at a distance H and are located generally equidistant from the longitudinal centerline X of the trailer system 4.

Figure 3:
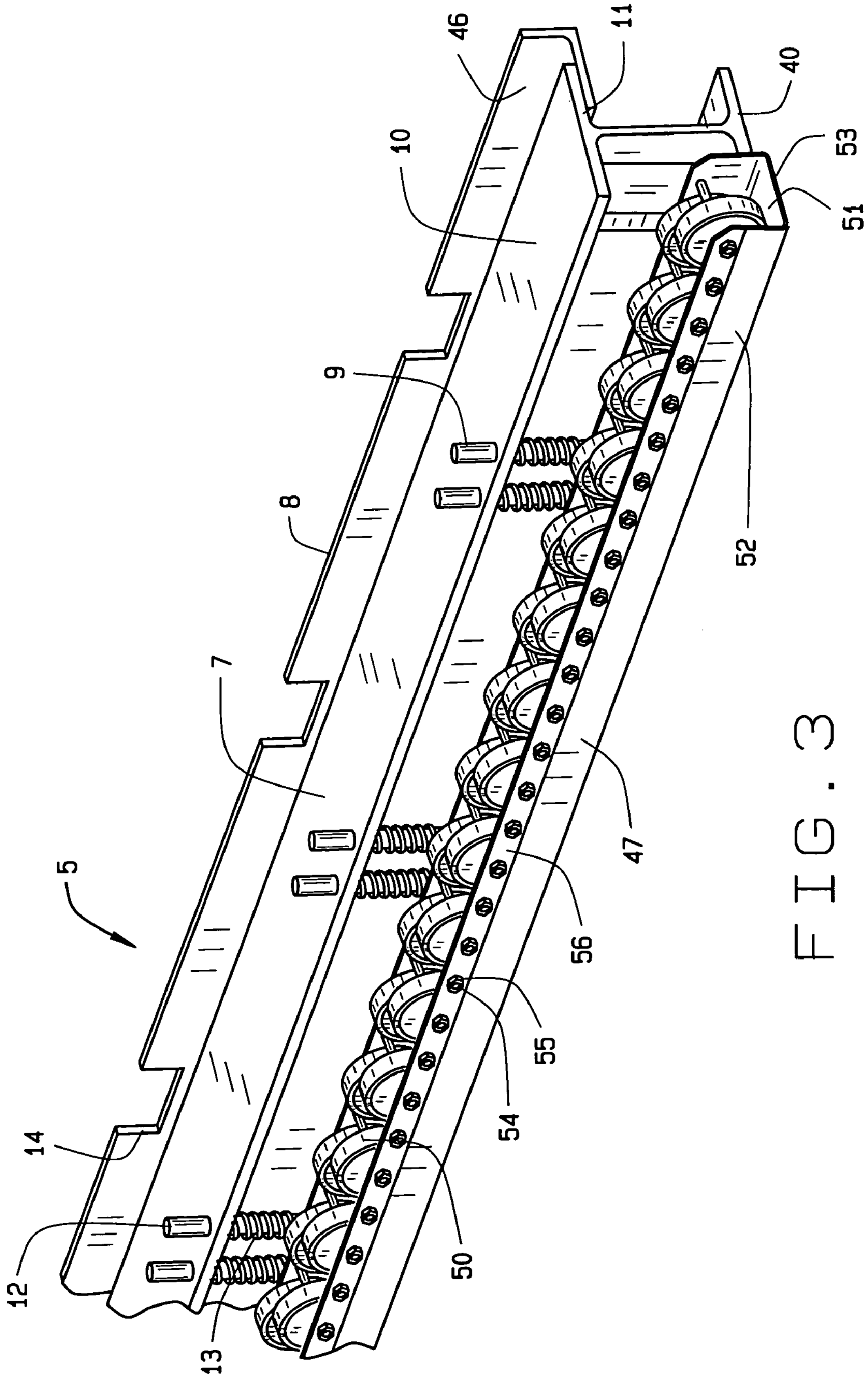
FIG. 3 is a perspective view showing the arrangement of the horizontal clamping surfaces.

The first framing jig 5 (FIG. 3) comprises an I-beam 7, a locator angle 8, and a plurality of spring loaded locator pins 9. The plurality of spring loaded locator pins 9 are arranged in groups of two, with the space between each of the two locator pins 9 being sized to allow for the placement of a standard 2×4 inch wood frame construction stud that has been positioned such that the 2 inch side of the wood frame construction stud contacts an upper surface 10 of the first framing jig 5. The centerline of each two-pin group of spring loaded locator pins 9 is located at about 16.00 inches from the centerline of each adjacent two-pin group of locator pins. This distance allows for construction of a frame wall with the vertical frame construction studs located at the standard industry construction location of about 16.00 inches on center. Each individual spring loaded locator pin 9 is mounted to the upper flange 11 of the I-beam 7. The I-beam 7 has a plurality of openings in the upper flange 11 that allow the installed spring loaded locator pins 9 to protrude about 1.50 inches beyond the upper flange 11 of the I-beam 7. Each spring loaded locator pin 9 comprises a cylindrical pin 12 and a spring 13.

Although the primary purpose of the plurality of spring loaded locator pins 9 is to located the vertical frame studs 17 (FIG. 10) within the frame wall B being constructed, the spring loaded nature of the spring loaded locator pins 9 (FIG. 3) allows the pins to be depressed below the upper surface 10 of the upper flange 11 of the I-beam 7. This allows for the relocation of any of the plurality of spring loaded locator pins 9 whenever the design of the frame wall B being fabricated has vertical frame studs 17 (FIG. 10) at locations other than the standard 16.00 inches on center location for vertical frame studs. Additionally, this also allows any of the plurality of spring loaded locator pins 9 (FIG. 3) to be depressed if there is interference between any spring loaded pin 9 and a header 20 (FIG. 10) or footer 21 for a door opening 19 or window opening 18 in the frame wall B being fabricated.

The locator angle 8 (FIG. 3) is attached to the I-beam 7 by locating a horizontal flange of the locator angle 8 to the underside of the upper flange 11 of the I-beam 7. In the present embodiment, the locator angle 8 is attached with threaded fasteners, however, other forms of attachment such as rivets or welding may be used while still remaining within the scope of the present invention. The locator angle 8 has a plurality of access openings 14 in a vertical flange 46 of the locator angle 8. Each of the plurality of access openings 14 are in alignment with at least one of the two pin groupings of the plurality of spring loaded locator pins 9. The plurality of access openings 14 provides access to the two upper frame plates 15 (FIG. 10) and the lower frame plate 16 of the frame wall B being fabricated such that nails can be placed into the upper or lower frame plates 15 and 16 to attach each of the vertical stud members 17 to the upper and lower frame plates 15 and 16.

Figure 9:
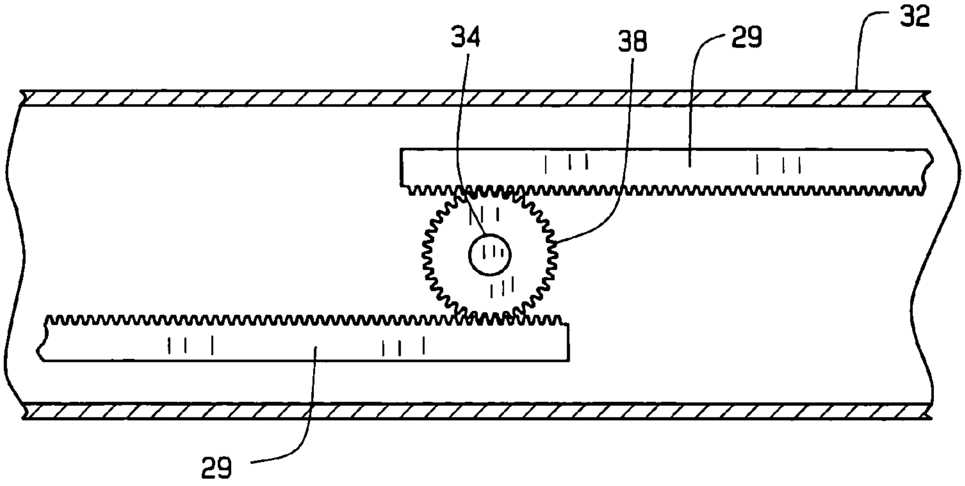
FIG. 9 is a section view of the rack and pinion area of the clamping frame.

Each of the first framing jig 5 (FIG. 1) and the second framing jig 6 are mounted onto four clamping tube assemblies 28. Each clamping tube assembly 28 has a distal end and a proximate end. The first and second framing jigs 5 and 6 are mounted onto the upper surface of the proximate ends of each of the clamping tube assemblies 28. The distal end of each clamping tube assembly 28 is equipped with a gear rack 29 (FIG. 9).

Four sets of slider tube assemblies 30 (FIG. 2) are mounted onto the main trailer frame 31. Each set of slider tube assemblies 30 comprises an upper tube 32 and a lower tube 33. The upper tube 32 and the lower tube are substantially equal in length and the upper tube 32 is attached to the lower tube 33 such that the ends of both tubes are generally even. The lower tube 33 is attached transversely to the longitudinal axis X of the main trailer frame 31 with the midpoint of the length of the upper tube 32 and the lower tube 33 in general alignment with the longitudinal axis X of the main trailer frame 31, and with the upper tube 32 resting upon the upper surface of the lower tube 33.

Figure 8:
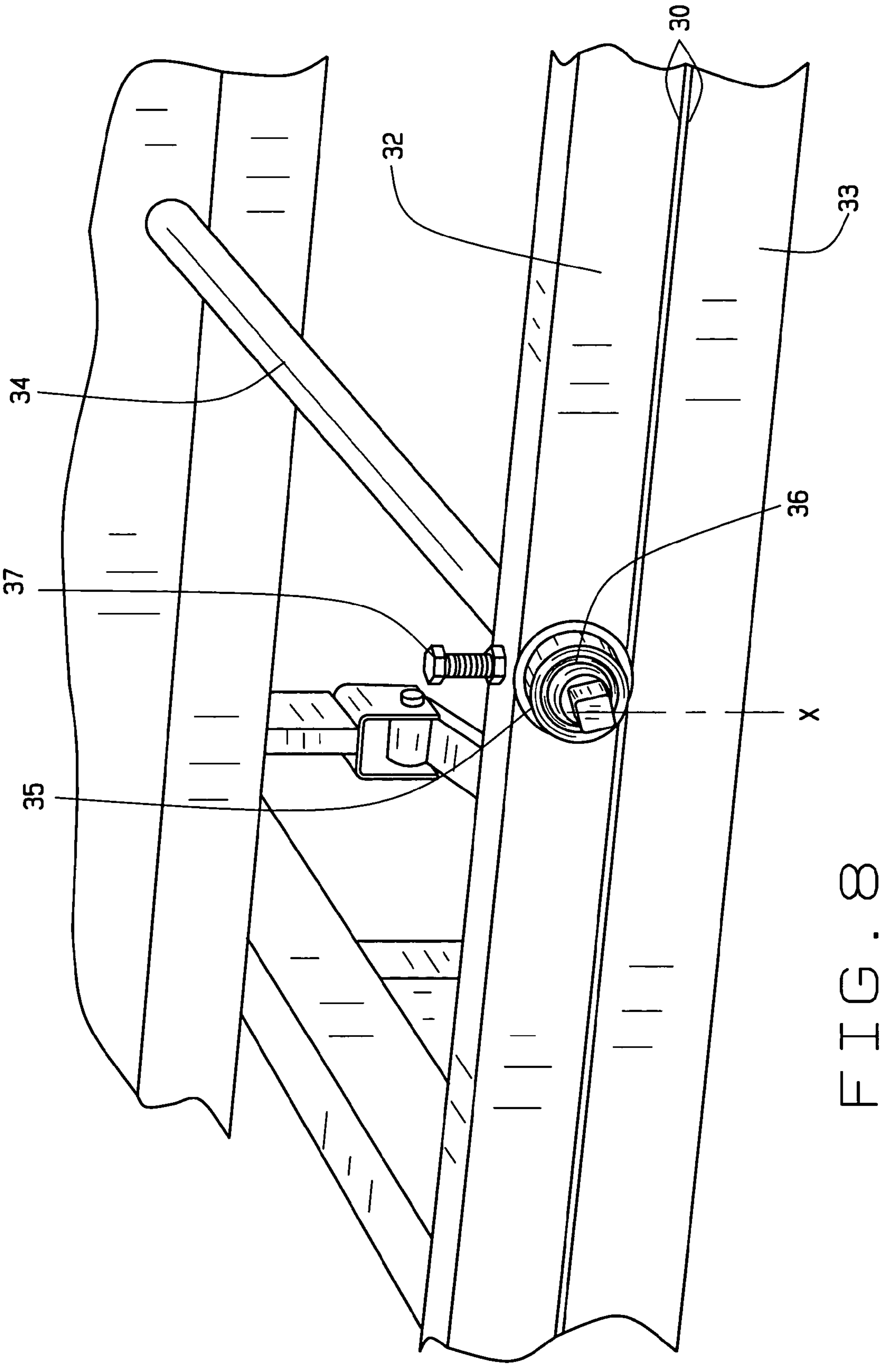
FIG. 8 is a front view of the rack and pinion area of the clamping frame.

A plurality of drive shaft openings 35 (FIG. 8) in the upper tube 32 of each of the three sets of slider tube assemblies 30 are located generally on the longitudinal axis X of the main trailer frame 31 and are sized to accept a drive shaft 34. A bearing 36 for supporting the drive shaft 34 is located in at least two of the plurality of drive shaft openings 35. The drive shaft 34 is inserted through each of the plurality of drive shaft openings 35 and the ends of the drive shaft 34 are inserted into each of the at least two bearings 36. A set screw 37 is used to clamp the drive shaft 34 into each of the bearings 36.

A gear 38 (FIG. 9) is located on the drive shaft 34 inside each of the slider tube assemblies 30 where the drive shaft 34 extends through one of the plurality of drive shaft openings 35. As seen in FIG. 9, the gear rack 29 of the clamping tube assembly 28 of the first framing jig 5 is positioned beneath the gear 38, and the gear rack 29 of the clamping tube assembly 28 of the second framing jig 6 is positioned over the gear 38. When assembled, the gear 38 and the two gear racks 29 are arranged to generally operate as a rack and pinion.

Figure 4:
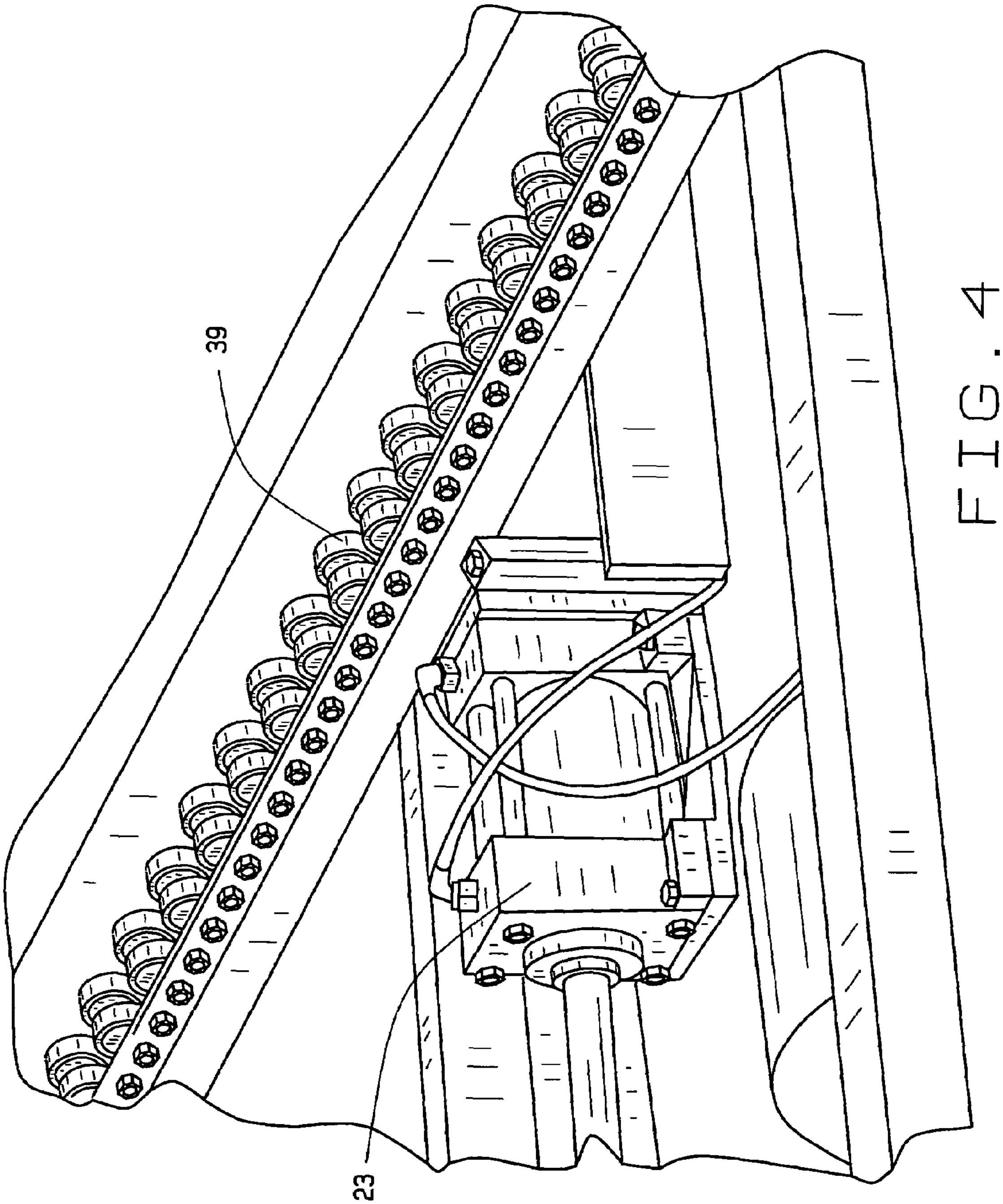
FIG. 4 is a perspective view showing the arrangement of the main pneumatic clamping cylinder.
Figure 11:
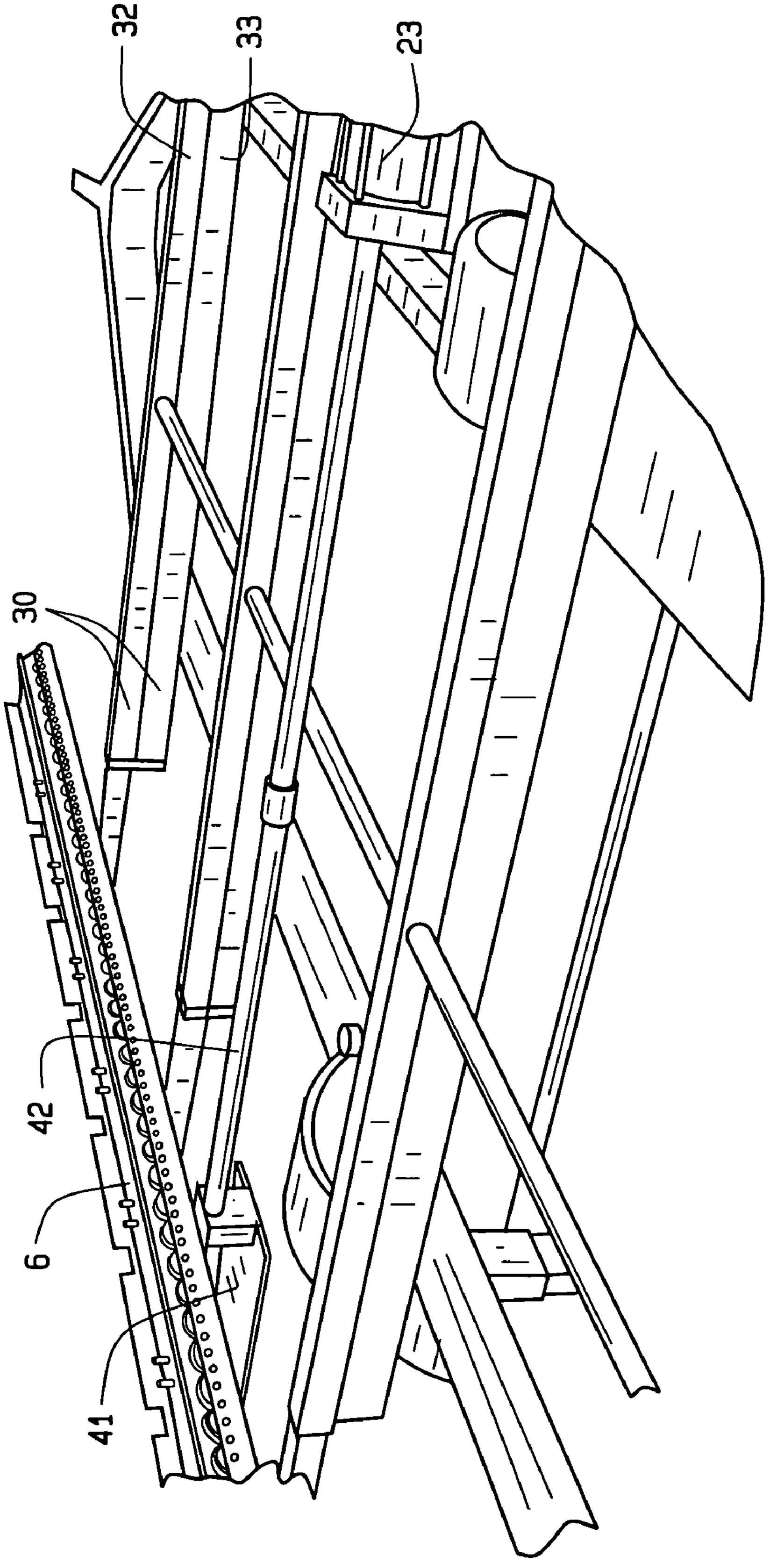
FIG. 11 is a perspective view showing the clamping system of one embodiment of the present invention.

A first mounting frame 39 (FIG. 4) is attached to the lower flange 40 (FIG. 3) of the I-beam 7 of the first framing jig 5. A clamping cylinder 23 (FIG. 4) is attached to the mounting frame 39 such that the piston of the clamping cylinder 23 is transverse to the longitudinal axis X of the main trailer frame 31. A second mounting frame 41 (FIG. 11) is attached to the lower flange 40 (FIG. 3) of the I-beam 7 of the second framing jig 6. A piston extension 42 (FIG. 11) is attached to the piston 45 of the clamping cylinder 23 and to the second mounting frame 41.

The clamping system 2 provides a means of clamping the components of the frame wall B until the entire frame wall B can be assembled. FIG. 10 shows one example of a frame wall B to be constructed using the present invention. In the clamping process, all of the components of the frame wall B, including the two upper frame plates 15, the lower frame plate 16, the vertical studs 17, the headers 20, and the footers 21 have been placed into the portable wall framing fixture A. More specifically, the two upper frame plates 15 are placed on the upper surface 10 of the I-beam 7 (FIG. 3 and FIG. 10) of the first framing jig 5, with the 2 inch edge of the two upper frame plates 15 in contact with the upper surface 10. In a similar manner, the lower frame plate 16 is placed on the upper surface 10 of the I-beam of the second framing jig 6. All necessary vertical studs 17 are then placed between the two upper frame plates 15 and the lower wall frame plate 16, with the 2 inch edge of the vertical studs 17 contacting the upper surface 10 of the I-beam 7 of both the first framing jig 5 and the second framing jig 6 such that the vertical studs 17 bridge the gap between the first framing jig 5 and the second framing jig 6. All other headers 20 and footers 21 are placed in position as needed between the vertical studs 17 and the two upper frame plates 15 and the lower frame plate 16. Where the location of any vertical stud 17, corner vertical stud 22, header 20, or footer 21 places that component in dimensional conflict with any of the plurality of spring loaded locator pins 9, the interfering spring loaded locator pin 9 is depressed to allow the framing component to contact the upper surface 10 of the I-beam 7 of either the first framing jig 5 or the second framing jig 6 as necessary.

When all the components of the frame wall B are located loosely between the first framing jig 5 and the second framing jig 6, and are resting upon the upper surfaces 10 of the I-beams 7 of each of the first and second framing jigs 5 and 6, the clamping system 2 is activated to clamp all of the components of the frame wall B together in preparation for the assembly of the components.

Figure 12:
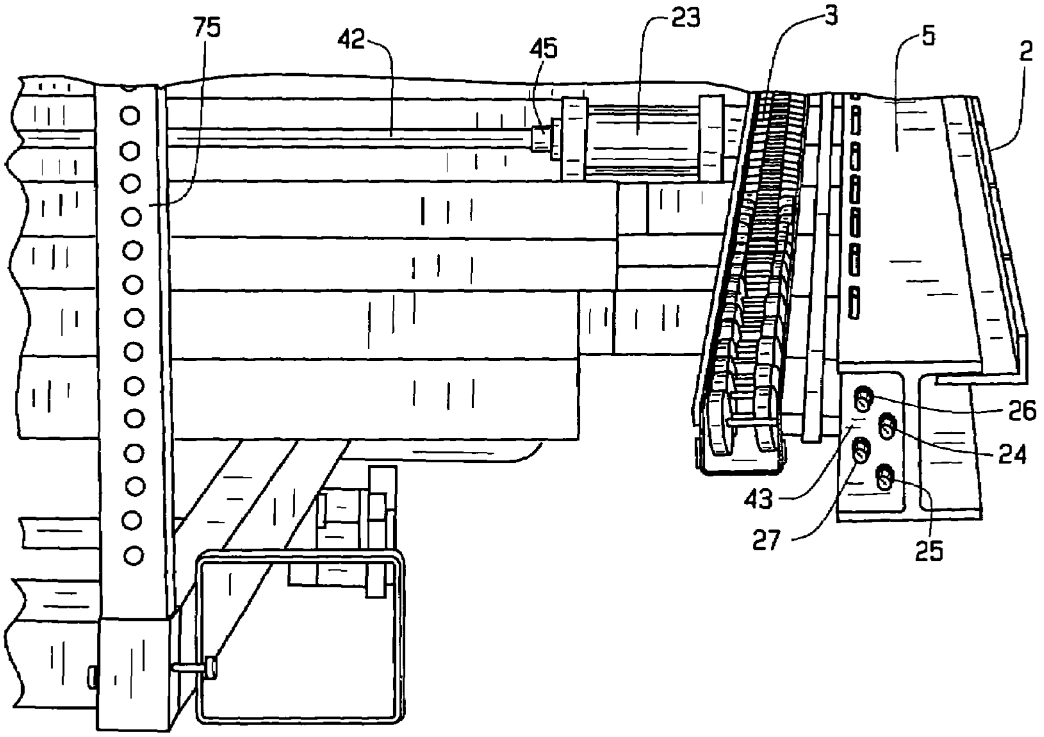
FIG. 12 is a perspective view shows the clamping and offloading activation controls in one embodiment of the present invention.

The clamping process is initiated when the operator activates one of the control buttons on a bank of control buttons 43 (FIG. 12) that is located at one end of each of the first framing jig 5 and the second framing jig 6. In the current embodiment of the present invention as described herein, the control buttons are used to direct and control pressurized air. It will be appreciated, however, that other types of fluid, such as for example hydraulic fluid, may also be used while still remaining within the scope of the present invention. Likewise, electrical, mechanical, and electromechanical controls may also be used in place of the pneumatic controls described in the present embodiment and also remain within the scope of the present invention. The required function of each controlling device herein is disclosed in a manner that will allow those skilled in the well known art of hydraulic, electrical, mechanical, and electromechanical control devices to readily adapt or replace the pneumatic control devices described in the current embodiment of the present invention with similar devices from those other areas of control devices and those other types of control devices are within the scope of the present invention.

Two of the pneumatic control buttons are used to activate and deactivate the clamping cylinder 23 in the clamping system 2. Specifically, a clamping activation button 24 engages a pneumatic circuit that actuates the clamping cylinder 23 to pull the first framing jig 5 and the second framing jig 6 together. The clamping action takes place when the pressurized air in the clamping cylinder 23 retracts the piston 45. Because the piston 45 is attached to the piston extension 42, and the piston extension 42 is attached to the second mounting frame 41 connected to the first framing jig 5, extension of the piston 45 causes the first framing jig 5 to extend away from the second framing jig 6 while retraction of the piston 45 causes the first framing jig 5 to move toward the second framing jig 6. During the clamping process, the gear rack 29 (FIG. 9) on each of the clamping tube assemblies 28 simultaneously rolls around the gear 38 on the drive shaft 34 thereby providing a precise and controlled movement of the first framing jig 5 (FIG. 1) in relation to the second framing jig 6. The actual pneumatic interconnections are well-known in the art and it is understood that the pneumatic control system described herein includes all necessary hose, pipe, or tubing connections between the pneumatic components as need to allow the pneumatic system to function as described herein. The same holds true when hydraulic, electrical, or electromechanical controls are used in the present invention.

As the first framing jig 5 and the second framing jig 6 approach each other, the vertical flange 46 (FIG. 3) of the locator angle 8 on the first framing jigs 5 approaches and comes into contact with the two upper frame plates 15, and the vertical flange 46 of the locator angle 8 on the second framing jig 6 approaches and comes into contact with the lower frame plate 16. As the clamping process continues, the two upper frame plates 15 and the lower frame plate 16 approach and contact the plurality of vertical studs 17 and any corner vertical studs 22. The clamping process also biases other components of the frame wall B against any headers 20 or footers 21. The clamping process 2 is completed when the piston 45 (FIG. 12) of the clamping cylinder 23 accomplishes the clamping together of the wall frame components or until the clamping cylinder 23 reaches the end of its travel. It is appreciated that the range of travel of the piston 45 allows for variances in the overall height of the frame wall B and the length of the piston can be adjusted to compensate for frame walls B that are shorter or taller than the standard 8 feet height. In fact, the amount of travel in clamping system 2 allows for assembly of wall frames B varying in height from about eight feet to about ten feet. Once the clamping process 2 is complete, the components of the frame wall B is assembled in accordance with the local construction code.

When the components of the frame wall B have been assembled, the clamping deactivation button 25 is actuated to cause the piston 45 of the clamping cylinder 23 to extend. As the piston 45 extends, the piston extension 42 attached to the piston 45 also extends and together the piston 45 and the piston extension 42 act to bias the first mounting frame 39 on the first framing jig 5 away from the second mounting frame 41 on the second framing jig 6 thereby moving the first framing jig 5 away from the second framing jig 6. The unclamping action continues until the piston 45 reaches the end of its travel within the clamping cylinder 23. It is understood that during the unclamping process, the assembled frame wall B is released from the vertical flange 46 (FIG. 3) of the locator angle 8 of each of the first framing jig 5 and the second framing jig 6 and makes the assembled frame wall B ready for the offloading system 3 to position the frame wall B for removal from the portable wall framing fixture A.

Figure 2:
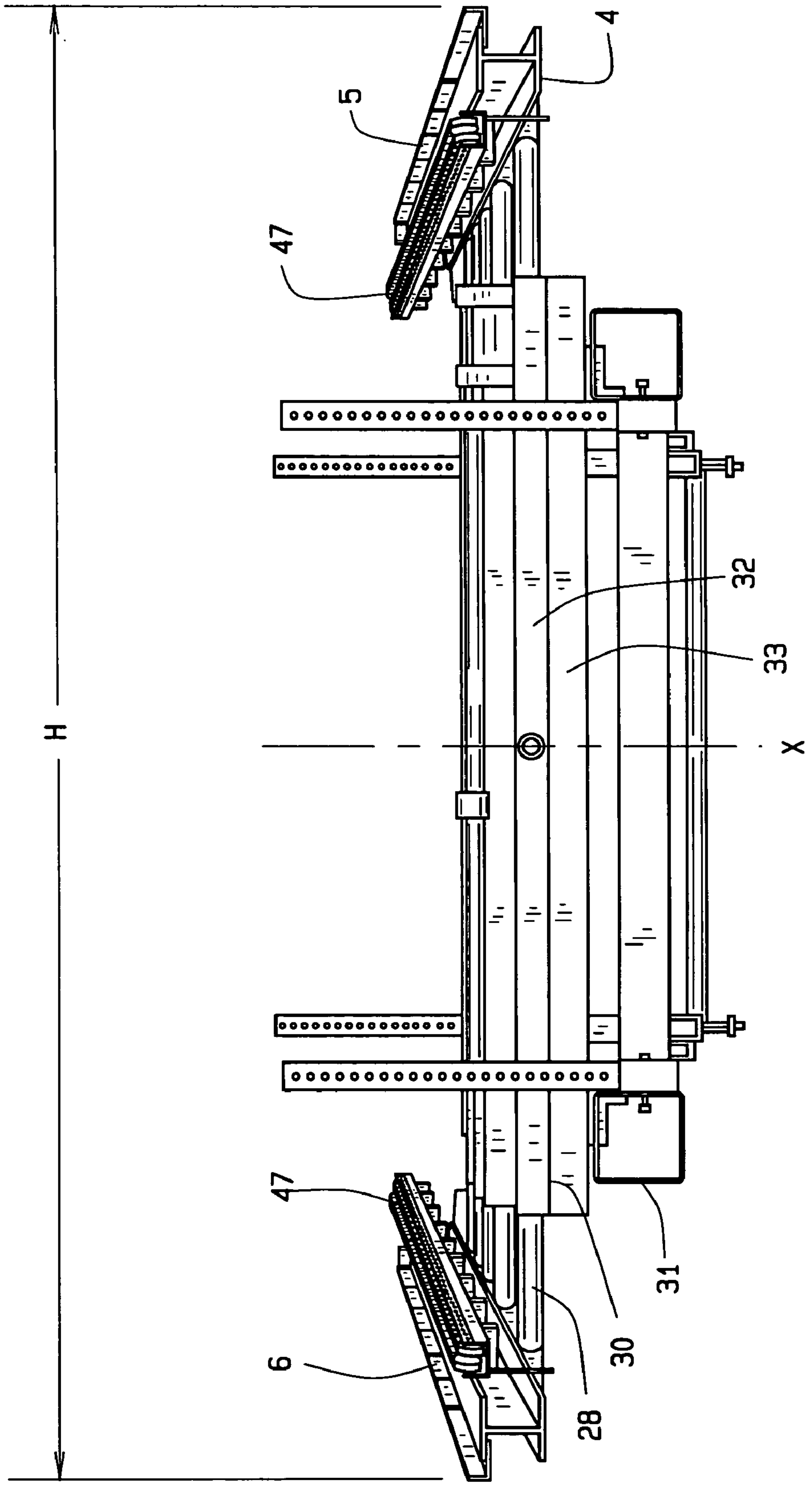
FIG. 2 is a rear perspective view of one embodiment of the present invention.

The offloading system 3 generally comprises two ramp assemblies 47 that raise or lower the completed frame wall B from the portable framing fixture A. As shown in FIG. 2, one ramp assembly 47 is attached to the first framing fixture 5 and the second ramp assembly 47 is attached to the second framing fixture 6. Each ramp assembly includes a plurality of rolling elements 50 (FIG. 3) mounted into a channel 51 having two vertical flanges 52 and a horizontal connecting member 53. In the present embodiment, the plurality of rolling elements 50 are wheels and each of the wheels are attached to the channel 51 with a bolt 54 and a nut 55 that are mounted in one of a set of axle openings 56 in the two vertical flanges 52 of the channel 51. It will be appreciated that the set of axle openings 56 are located and sized such that any one of the axle openings 56 in a vertical flange 52 of the channel 51 match and are in axial alignment with another axle opening 56 in the other vertical flange 52 of the channel 51. The diameter of the set of axle openings 56 is sized to match the diameter of the bolts 54 and to allow the bolts 54 to be inserted into the axle openings 56 of the channel 51. It is understood that each of the wheels in the current embodiment include a bearing located at the axial centerline of each wheel, and that during assembly of the ramp assemblies 47, the bolt 54 is inserted through one of the axle mounting openings 56 in one of the vertical flanges 52 of the channel, then through the bearing of the wheel, and then through the axle mounting opening 56 in the other vertical flange 52 of the channel 51. The nut 55 is then attached to the end of the bolt 54 to secure the wheel between the two vertical flanges 52 of the channel 51. In the present embodiment, spacers 57 are also included to alternately locate each of the wheels to be near one of the vertical flanges 52 of the channel, with the next adjacent wheel located near the other vertical flange 52 of the channel 51. It is understood that while the plurality of rolling elements 50 in the present embodiments are wheels, other types of rolling elements may be used. For example, rollers that generally extend between the two vertical flanges 52 of the channel 51 may be used in place of the wheels. Any other rolling device may also be used as long as the rolling device allows the assembled frame wall B to be removed from the portable frame fixture A by rolling the assembled frame wall B off of the portable frame fixture A.

Figure 7:
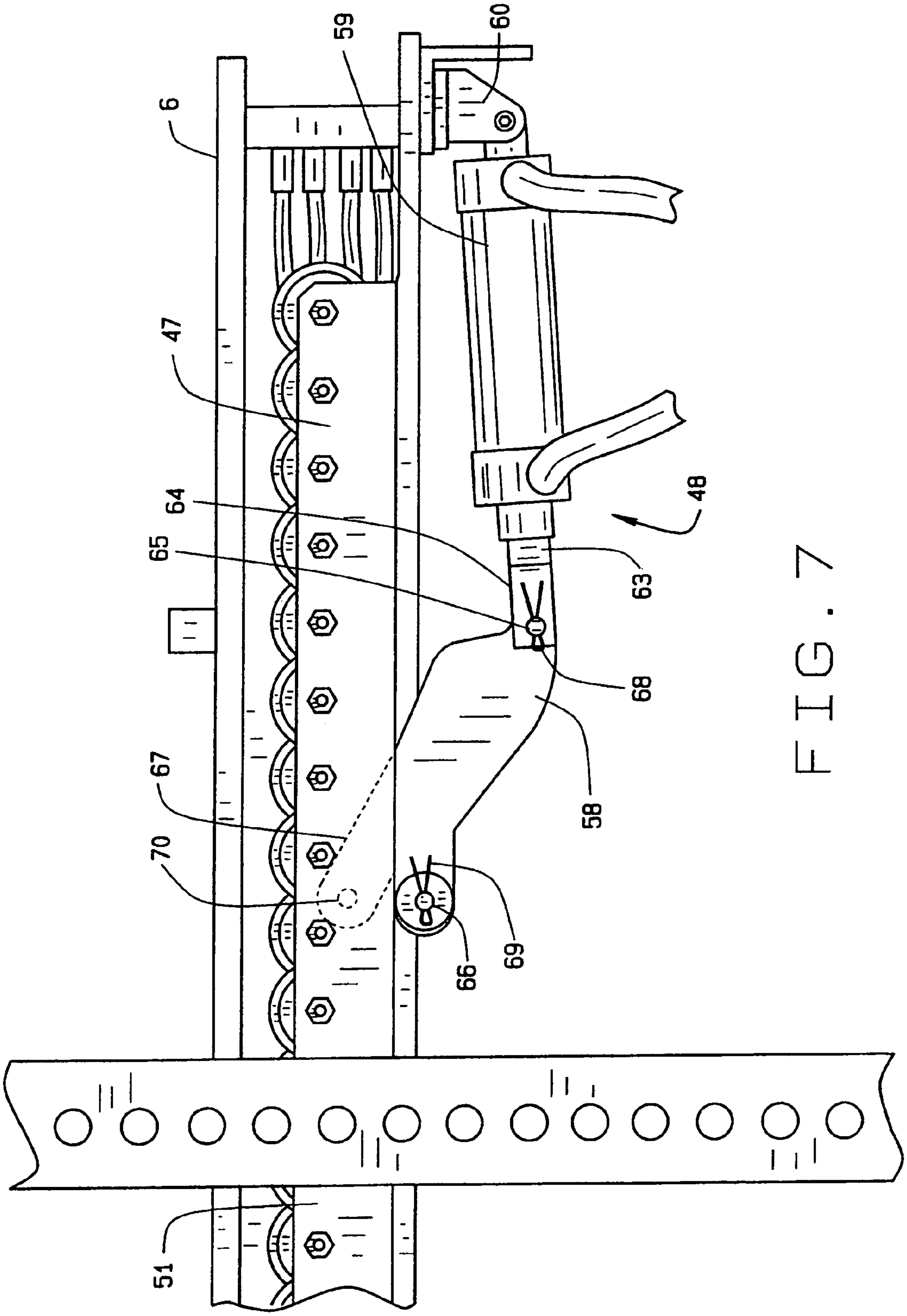
FIG. 7 is a side view of the offloading mechanism.

It will be appreciated that the following description applies to each of the two ramp assemblies 47, one of which is attached to the first framing jig 5 and the other being attached to the second framing jig 6. Each ramp assembly 47 (FIG. 7) is attached to its related framing jig 5 or 6 by an actuator lever assembly 48. Each actuator lever assembly comprises a lever 58, a cylinder 59, and an end pivot 60. The lever 58 has a distal end 67, a proximate end 68, and an intermediate pivot opening 69. The cylinder 59 includes a rod 63 that attaches to the proximate end 68 of the lever 58 with a clevis 64 and clevis pin 65. The distal end 67 of the lever 58 is attached to the one of the two vertical flanges 52 of the channel 51 with a pin assembly 66. The lever 58 is also pivotally attached to the I-beam 7 of the applicable first or second framing jig, 5 or 6 with a pivot pin assembly 70 installed into the intermediate pivot opening 69 of the lever 58. It is understood that in the present embodiment, each ramp assembly has one cylinder 59, however, more than one cylinder may be used and still remain within the scope of the present invention.

Figure 13:
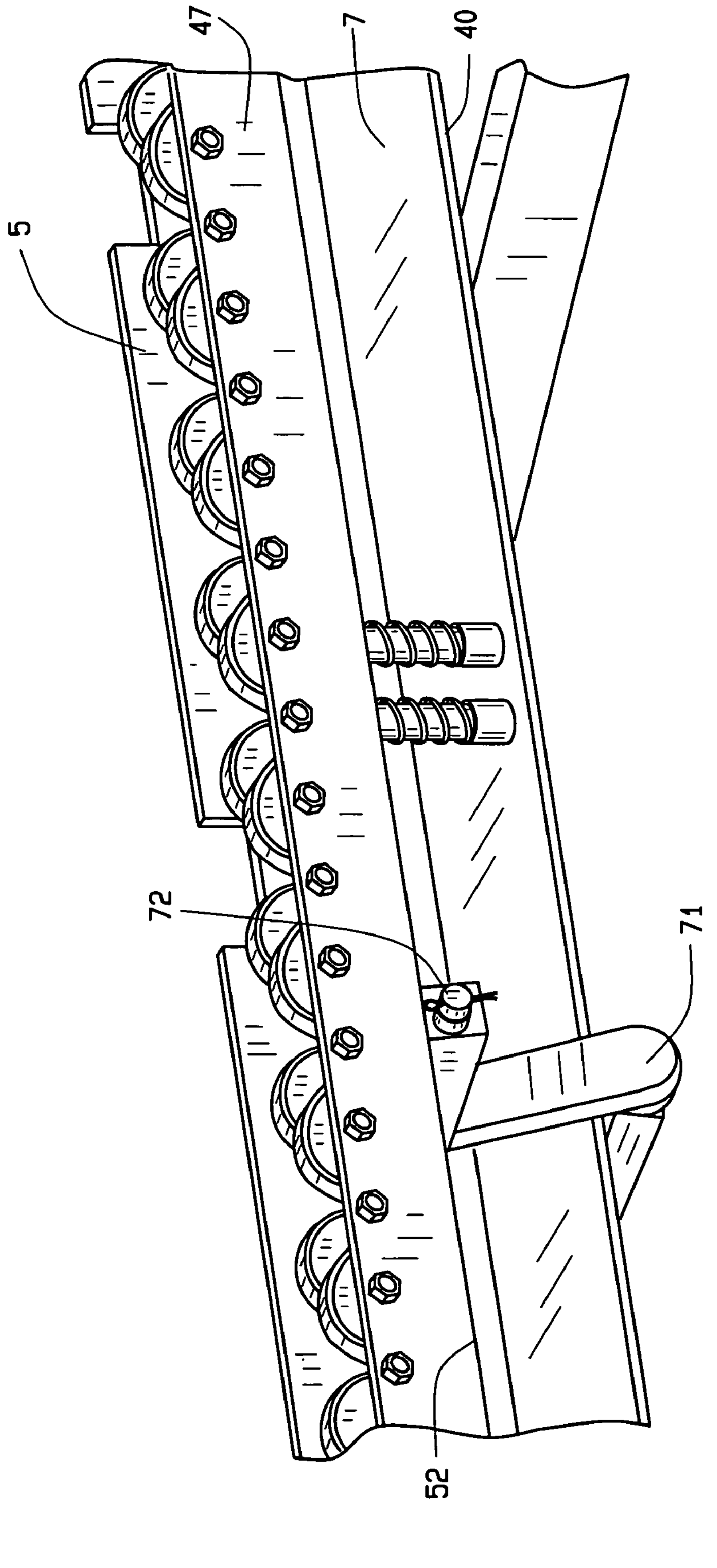
FIG. 13 is a perspective view showing the pivot levers of the offloading system of one embodiment of the present invention.

Each ramp assembly 47 also has a plurality of pivoting levers 71 (FIG. 13) that attach each of the two ramp assemblies 47 to the I-beam 7 of the applicable framing jig 5 or 6. Each pivoting lever 71 is attached to the I-beam 7 and to the same vertical flange 52 of the channel 51 that the distal end 67 of the actuator lever assembly 48 is attached. Pivot pin assemblies 72 are used to attach the pivoting lever 71 to the vertical flange 52 and to the I-beam 7.

Figure 5:
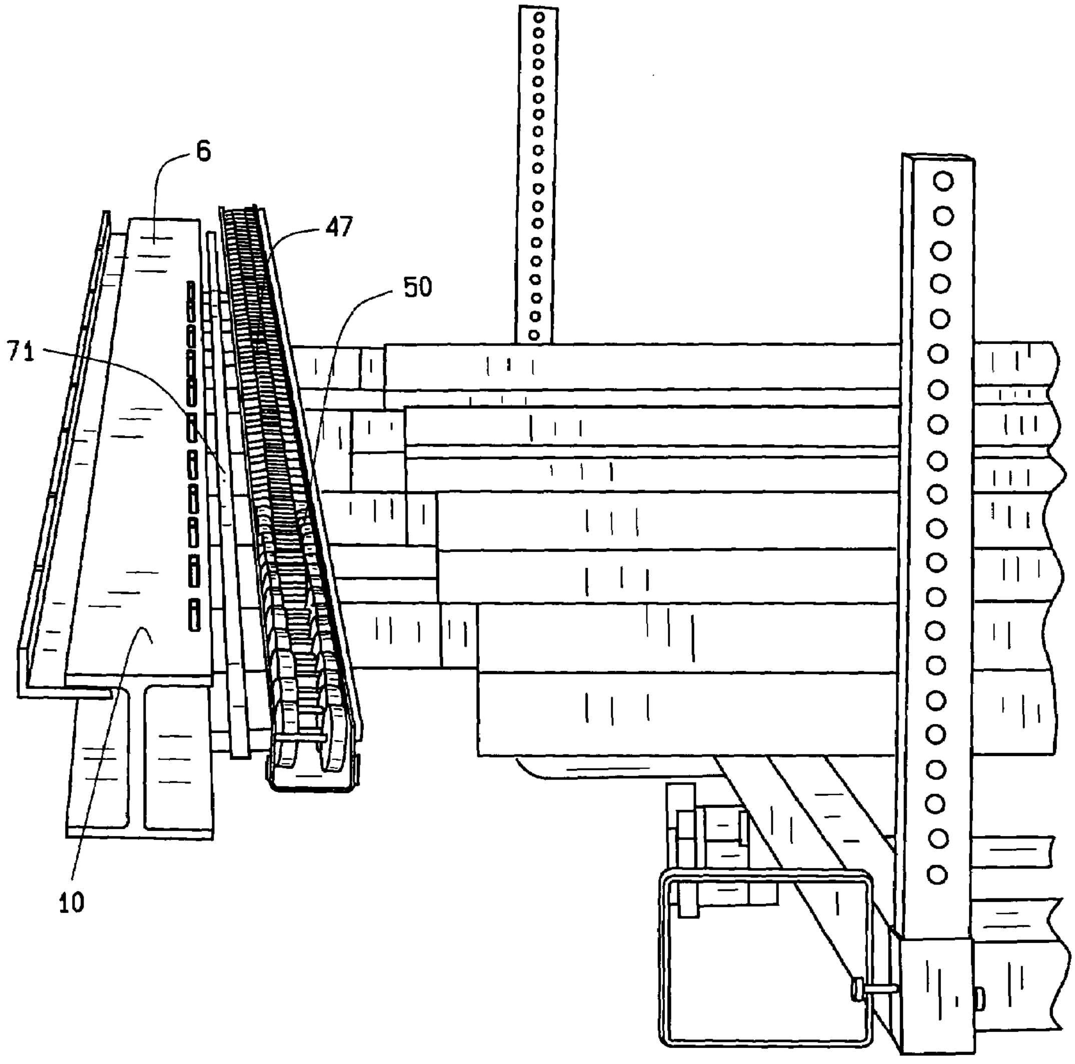
FIG. 5 is an end view of one clamping frame showing the offloading mechanism in its retracted position.
Figure 6:
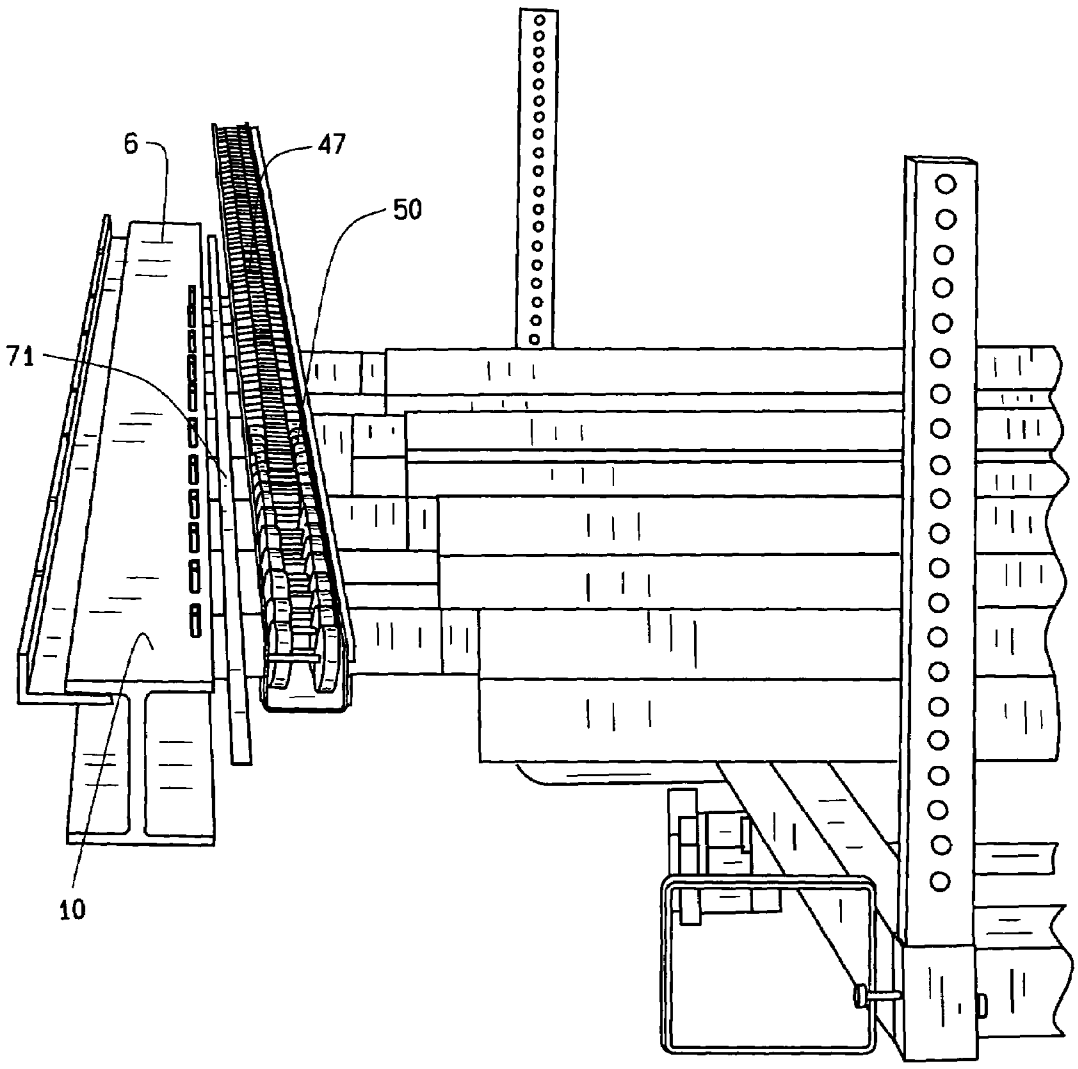
FIG. 6 is an end view of one clamping frame showing the offloading mechanism in its extended position.

The offload system 3 is initiated by actuation of the offloading activation button 26 (FIG. 12) to allow the cylinders 59 (FIG. 7) to become pressured by fluid (in the present embodiment, the fluid used is air), thereby extending the rod 63. Because the rod 63 is attached to the proximate end 68 of the lever 58 with the clevis 64 and the clevis pin 65, the extension of the rod 63 pushes the proximate end 68 of the lever 58 toward the rear of the main trailer 31. The lever 58 pivots around the pivot pin assembly 71 (FIG. 13) installed into the intermediate pivot opening 69 of the lever 58, causing the distal end 67 of the lever 58 to raise and to move toward the front end of the main trailer frame 31. Simultaneously, the two ramp assemblies 47 are also lifted upward by the plurality of pivoting levers 71. In the fully activated position, each of the two ramp assemblies 47 are held at a position as shown in FIG. 6 such that the top of the plurality of rolling elements 50 are higher than the upper surface 10 of the I-beams 7. Because the rolling elements 50 are higher than the upper surface 10 of the I-beams 7, the assembled frame wall B is lifted from the upper surface 10 and rests on the plurality of rolling elements 50. The operator can then roll the frame wall B off the portable framing fixture A. After the frame wall B is removed, the offloading deactivation button 27 (FIG. 12) is actuated to release the fluid pressure from within the cylinder 59 (FIG. 7) thereby allowing the two ramp assemblies 47 to return to their resting position as shown in FIG. 5 to await the offloading of another newly constructed wall frame B.

The trailer system 4 (FIG. 1) includes the main trailer frame 31, an axle assembly 73, and four stabilization devices 75, as well as all lighting and electrical wiring to make the portable wall framing fixture A in compliance with all local and federal highway and traffic regulations. The size and type of axle suspension 76 and tires 77 are selected and sized as need to match the weight of the portable framing fixture A. The attachment of the axle assembly 73 to the trailer frame 31 is well known in the art and will not be described in detail herein. The trailer frame 31 in the present embodiment is generally constructed of tubing and is made airtight such that the trailer frame 31 acts as an air reservoir in the present embodiment for the pneumatic system that operates the locating system 1, the clamping system 2, and the offloading system 3. The four stabilization devices 75 are stored in the retracted position until the portable wall framing fixture A is positioned at a job site. At that time, the four stabilization devices 75 are lowered until they contact the ground to stabilize the portable wall framing fixture A during use.

While the above description describes various embodiments of the present invention, it will be clear that the present invention may be otherwise easily adapted to fit any configuration where a portable wall framing fixture having the ability to ensure square wall frames and be adjustable for a wide variety of frame wall designs is required.

As various changes could be made in the above constructions without departing from the scope of the invention, it is intended that all matter contained in the above description or shown in the accompanying drawings shall be interpreted as illustrative and not in a limiting sense.

What is claimed is:

1. A portable framing fixture comprising:

a trailer system; and a locating system for locating a set of framing components, the locating system including a first framing jig and a second framing jig such that the first framing jig and the second framing jig are spaced apart at a distance H and are located generally equidistant from a longitudinal centerline X of the trailer system, and wherein each of the first framing jig and the second framing jig comprise an I-beam, a locator angle, and a plurality of spring loaded locator pins;

a clamping system for clamping the set of framing components, wherein the clamping system provides a means of clamping the set of framing components of a frame wall until the set of framing components can be assembled into the frame wall;

an offloading system for removing the set of framing components after assembly of the set of framing components into the frame wall, wherein the locating system, the clamping system, and the offloading system are mounted onto the trailer system.

2. The portable framing fixture of claim 1 wherein the plurality of spring loaded locator pins are arranged in a plurality of groups of two spring loaded locator pins, with the distance between each of the two spring loaded locator pins in each group being sized to allow for the placement of a standard 2×4 inch wood frame construction stud that has been positioned such that the 2 inch side of the wood frame construction stud is between the two spring loaded locator pin of one group and contacts an upper surface of one of either the first framing jig or the second framing jig.

3. The portable framing fixture of claim 2 wherein the centerline of each two-pin group of spring loaded locator pins is located at about 16.00 inches from the centerline of each adjacent two-pin group of spring loaded locator pins.

4. The portable framing fixture of claim 3 wherein each individual spring loaded locator pin is mounted to an upper flange of the I-beam and the I-beam has a plurality of openings in the upper flange that allow the installed spring loaded locator pins to protrude about 1.50 inches beyond the upper flange of the I-beam.

5. The portable framing fixture of claim 4 wherein each spring loaded locator pin comprises a cylindrical pin and a spring.

6. The portable framing fixture of claim 5 wherein the spring loaded locator pins are depressable to a point substantially below the upper surface of the upper flange of the I-beam.

7. The portable framing fixture of claim 6 wherein each of the first framing jig and the second framing jig are mounted onto three clamping tube assemblies, with each clamping tube assembly having a distal end and a proximate end.

8. The portable framing fixture of claim 7 wherein the first and second framing jigs are mounted onto the upper surface of the proximate ends of each of the clamping tube assemblies.

9. The portable framing fixture of claim 8 wherein the distal end of each clamping tube assembly is equipped with a gear rack.

10. The portable framing fixture of claim 9 wherein a plurality of sets of slider tube assemblies are mounted onto a main trailer frame of the trailer system, each set of slider tubes comprising an upper tube and a lower tube, the upper tube and the lower tube are substantially equal in length and the upper tube is attached to the lower tube such that the ends of both tubes are generally even.

11. The portable framing fixture of claim 10 wherein the lower tube is attached transversely to the longitudinal axis X of the main trailer frame with the midpoint of the length of the upper tube and the lower tube in general alignment with the longitudinal axis X of the main trailer frame, and with the upper tube resting upon the upper surface of the lower tube.

12. The portable framing fixture of claim 11 wherein a plurality of drive shaft openings in the upper tube of each of the three sets of slider tube assemblies are located on the longitudinal axis X of the main trailer frame and are sized to accept a drive shaft.

13. The portable framing fixture of claim 12 wherein a bearing for supporting the drive shaft is located in at least two of the plurality of drive shaft openings.

14. The portable framing fixture of claim 13 wherein the drive shaft is inserted through each of the plurality of drive shaft openings and the ends of the drive shaft are inserted into each of the two bearings and a set screw is used to clamp the drive shaft into each of the bearings.

15. The portable framing fixture of claim 14 wherein a gear is located on the drive shaft inside each of the slider tube assemblies where the drive shaft extends through one of the plurality of drive shaft openings and wherein the gear rack of the clamping tube assembly of the first framing jig is positioned beneath the gear, and the gear rack of the clamping tube assembly of the second framing jig is positioned over the gear such that the gear and the two gear racks are arranged to operate generally as a rack and pinion.

16. The portable framing fixture of claim 15 wherein a first mounting frame is attached to a lower flange of the I-beam of the second framing jig and a clamping cylinder is attached to the mounting frame such that the piston of the clamping cylinder is transverse to the longitudinal axis X of the main trailer frame, wherein a second mounting frame is attached to the lower flange of the I-beam of the first framing jig and wherein a piston extension is attached to the piston of the clamping cylinder and to the second mounting frame.

17. The portable framing fixture of claim 16 wherein, after the set of framing components are located loosely between the first framing jig and the second framing jig, and are resting upon the upper surfaces of the I-beams of each of the first and second framing jigs, the clamping system is activated to clamp the set of framing components together in preparation for assembly of the set of framing components.

18. The portable framing fixture of claim 17 wherein a clamping process is initiated when an operator activates one of a plurality of pneumatic control buttons on a bank of pneumatic control buttons located at one end of each of the first framing jig and one end of the second framing jig, wherein at least two of the pneumatic control buttons are used to activate and deactivate a clamping cylinder in the clamping system by pressurizing the clamping cylinder to retract a piston attached to a piston extension, the piston extension being attached to the second mounting frame connected to the first framing jig, thereby causing an extension of the piston to relocate the first framing jig away from the second framing jig.

19. The portable framing fixture of claim 18 wherein during the clamping process, the gear rack on each of the clamping tube assemblies simultaneously roll around the gear on the drive shaft to control the movement of the first framing jig in relation to the second framing jig.

20. The portable framing fixture of claim 19 wherein the clamping process biases the set of framing components together.

21. The portable framing fixture of claim 20 wherein a range of travel of the piston allows for variances in an overall height of the frame wall and the length of the piston can be adjusted to compensate for frame walls where the overall height of the frame wall is between about eight feet to about ten feet.

22. The portable framing fixture of claim 21 wherein a clamping deactivation button is activated to cause the piston of the clamping cylinder to extend, wherein as the piston extends, the piston extension attached to the piston also extends and together the piston and the piston extension act to bias the first mounting frame on the first framing jig away from the second mounting frame on the second framing jig thereby moving the first framing jig away from the second framing jig.

23. The portable framing fixture of claim 22 wherein a locator angle is attached to the I-beam by locating a horizontal flange of the locator angle to the underside of the upper flange of the I-beam.

24. The portable framing fixture of claim 23 wherein the locator angle has a plurality of access openings in a vertical flange of the locator angle, each of the plurality of access openings being in alignment with at least one of the plurality of spring loaded locator pin groups.

25. The portable framing fixture of claim 24 wherein the offloading system generally comprises to two ramp assemblies that raise or lower the frame wall from the portable framing fixture.

26. The portable framing fixture of claim 25 wherein one of the two ramp assemblies is attached to the first framing jig and the other of the two ramp assemblies is attached to the second framing jig.

27. The portable framing fixture of claim 26 wherein each of the two ramp assemblies includes a plurality of rolling elements mounted into a channel having a set of two vertical flanges and a horizontal connecting member.

28. The portable framing fixture of claim 27 wherein each of the two ramp assemblies is pneumatically actuated by a pneumatic system.

29. The portable framing fixture of claim 28 wherein the plurality of rolling elements are wheels and each of the wheels are attached to the channel with a bolt and a nut that are mounted in one of a set of axle openings in the two vertical flanges of the channel, wherein spacers are included to alternately locate each of the wheels to be near one of the set of two vertical flanges of the channel, with the next adjacent wheel located near the other of the set of two vertical flanges of the channel.

30. The portable framing fixture of claim 29 wherein each ramp assembly is attached to its related framing jig by an actuator lever assembly, each actuator lever assembly comprising a lever, a cylinder, and an end pivot, the lever having a distal end, a proximate end, and an intermediate pivot opening, wherein the cylinder includes a rod that attaches to the proximate end of the lever with a clevis and clevis pin and the distal end of the lever being attached to the one of the set of two vertical flanges of the channel with a pin assembly, and wherein the lever is also pivotally attached to the I-beam of the applicable first or second framing jig with a pivot pin assembly installed into the intermediate pivot opening of the lever.

31. The portable framing fixture of claim 30 wherein each of the two ramp assemblies has a plurality of pivoting levers that attach the each of the two ramp assemblies to the I-beam of the applicable framing jig, wherein each pivoting lever is attached to the I-beam and to the same vertical flange of the channel that the distal end of the lever is attached, and wherein pivot pin assemblies are used to attach the pivoting lever to the vertical flange and to the I-beam.

32. The portable framing fixture of claim 31 wherein the the offloading system is initiated by depressing the offloading activation button to allow the cylinders to become fluid pressured thereby extending the rod, the rod being attached to the proximate end of the lever with a clevis and clevis pin whereby the extension of the rod pushes the proximate end of the lever toward the rear of the trailer system causing the lever to pivot around the pivot pin assembly installed into the intermediate pivot opening of the lever and causing the distal end of the lever to raise and to move toward the front end of the trailer system thereby lifting the two ramp assemblies upward by the plurality of pivoting levers such that in the fully activated position, each of the two ramp assemblies are held at a position such that the top of the plurality of rolling elements are higher than the upper surface of the I-beams.

33. The portable framing fixture of claim 32 wherein an offloading deactivator button is depressed to release the fluid pressure from within the cylinder thereby allowing the two ramp assemblies to return to a resting position.

34. The portable framing fixture of claim 33 wherein the trailer system includes an axle assembly and four stabilizing devices.

35. The portable framing fixture of claim 34 wherein the main trailer frame is generally constructed of tubing and includes an airtight portion capable of acting as an air reservoir for the pneumatic system that operates the locating system, the clamping system, and the offloading system.

36. A portable framing fixture comprising:

a trailer system having a main trailer frame, an axle assembly, and a plurality of stabilizing devices, wherein the main trailer frame is generally constructed of tubing and includes an airtight portion capable of acting as an air reservoir for a pneumatic system that operates a portable framing fixture;

a locating system for locating a set of framing components wherein the locating system includes a first framing jig and a second framing jig, wherein the first framing jig and the second framing jig are spaced a part at a distance H and are located generally equidistant from a longitudinal centerline X of the trailer system, wherein each of the first framing jig and the second framing jig comprise an I-beam, a locator angle, and a plurality of spring loaded locator pins, wherein the plurality of spring loaded locator pins are arranged in a plurality of groups of two spring loaded locator pins, with the distance between each of the two spring loaded locator pins in each group being sized to allow for the placement of a standard 2×4 inch wood frame construction stud that has been positioned such that the 2 inch side of the wood frame construction stud is between the two spring loaded locator pin of one group and contacts an upper surface of one of either the first framing jig or the second framing jig, wherein the centerline of each two-pin group of spring loaded locator pins is located at about 16.00 inches from the centerline of each adjacent two-pin group of spring loaded locator pins, wherein each individual spring loaded locator pin is mounted to an upper flange of the I-beam and the I-beam has a plurality of openings in the upper flange that allow the installed spring loaded locator pins to protrude about 1.50 inches beyond the upper flange of the I-beam, wherein each spring loaded locator pin comprises a cylindrical pin and a spring, wherein the spring loaded locator pins are depressable to a point substantially below the upper surface of the upper flange of the I-beam, wherein a locator angle is attached to the I-beam by locating a horizontal flange of the locator angle to the underside of the upper flange of the I-beam, and wherein the locator angle has a plurality of access openings in a vertical flange of the locator angle, each of the plurality of access openings being in alignment with at least one of the plurality of spring loaded locator pin groups;

a clamping system wherein the clamping system provides a means of clamping the components of the frame wall until the set of framing components can be assembled into a frame wall, wherein each of the first framing jig and the second framing jig are mounted onto three clamping tube assemblies, with each clamping tube assembly having a distal end and a proximate end, and wherein the first and second framing jigs are mounted onto the upper surface of the proximate ends of each of the clamping tube assemblies, wherein the distal end of each clamping tube assembly is equipped with a gear rack, wherein a plurality of sets of slider tube assemblies are mounted onto the main trailer frame, each set of slider tubes comprising an upper tube and a lower tube, the upper tube and the lower tube are substantially equal in length and the upper tube is attached to the lower tube such that the ends of both tubes are generally even, wherein the lower tube is attached transversely to the longitudinal axis X of the main trailer frame with the midpoint of the length of the upper tube and the lower tube in general alignment with the longitudinal axis X of the main trailer frame, and with the upper tube resting upon the upper surface of the lower tube, wherein a plurality of drive shaft openings in the upper tube of each of the three sets of slider tube assemblies are located on the longitudinal axis X of the main trailer frame and are sized to accept a drive shaft, wherein a bearing for supporting the drive shaft is located in at least two of the plurality of drive shaft openings, wherein the drive shaft is inserted through each of the plurality of drive shaft openings and the ends of the drive shaft are inserted into each of the two bearings and a set screw is used to clamp the drive shaft into each of the bearings, wherein a gear is located on the drive shaft inside each of the slider tube assemblies where the drive shaft extends through one of the plurality of drive shaft openings and wherein the gear rack of the clamping tube assembly of the first framing jig is positioned beneath the gear, and the gear rack of the clamping tube assembly of the second framing jig is positioned over the gear such that the gear and the two gear racks are arranged to operate generally as a rack and pinion, wherein a first mounting frame is attached to a lower flange of the I-beam of the second framing jig and a clamping cylinder is attached to the mounting frame such that a piston of the clamping cylinder is transverse to the longitudinal axis X of the main trailer frame, wherein a second mounting frame is attached to the lower flange of the I-beam of the first framing jig and wherein a piston extension is attached to the piston of the clamping cylinder and to the second mounting frame, wherein, after the set of framing components are located loosely between the first framing jig and the second framing jig, and are resting upon the upper surfaces of the I-beams of each of the first and second framing jigs, the clamping system is activated to clamp the set of framing components together in preparation for assembly of the set of framing components, wherein a clamping process is initiated when an operator activates one of a plurality of pneumatic control buttons on a bank of pneumatic control buttons located at one end of each of the first framing jig and one end of the second framing jig, wherein at least two of the pneumatic control buttons are used to activate and deactivate a clamping cylinder in the clamping system by pressurizing the clamping cylinder to retract a piston attached to a piston extension, the piston extension being attached to the second mounting frame connected to the first framing jig, thereby causing an extension of the piston to relocate the first framing jig away from the second framing jig, wherein during the clamping process, the gear rack on each of the clamping tube assemblies simultaneously roll around the gear on the drive shaft to control the movement of the first framing jig in relation to the second framing jig, wherein the clamping process biases the set of framing components together, wherein a range of travel of the piston allow for variances in an overall height of the frame wall and the length of the piston can be adjusted to compensate for the frame walls where the overall height of the frame wall is between about eight feet to about ten feet, and wherein a clamping deactivation button is activated to cause the piston of the clamping cylinder to extend thereby causing the piston extension to bias the first mounting frame on the first framing jig away from the second mounting frame on the second framing jig to move the first framing jig away from the second framing jig; and an offloading system for removing the set of framing components after assembly of the set of framing components into a frame wall, wherein the locating system, the clamping system, and the offloading system are mounted onto the trailer system, wherein the offloading system generally comprises two ramp assemblies that raise or lower the frame wall from the portable framing fixture, wherein one of the two ramp assemblies is attached to the first framing jig and the other of the two ramp assemblies is attached to the second framing jig, wherein each of the two ramp assemblies includes a plurality of rolling elements mounted into a channel having two vertical flanges and a horizontal connecting member, wherein each of the two ramp assemblies is pneumatically actuated by a pneumatic system, wherein the plurality of rolling elements are wheels and each of the wheels are attached to the channel with a bolt and a nut that are mounted in one of a set of axle openings in the two vertical flanges of the channel, wherein spacers are included to alternately locate each of the wheels to be near one of the vertical flanges of the channel, with the next adjacent wheel located near the other vertical flange of the channel, wherein each ramp assembly is attached to its related framing jig by an actuator lever assembly, each actuator lever assembly comprising a lever, a cylinder, and an end pivot, the lever having a distal end, a proximate end, and an intermediate pivot opening, wherein the cylinder includes a rod that attaches to the proximate end of the lever with a clevis and clevis pin and the distal end of the lever being attached to one of the two vertical flanges of the channel with a pin assembly, and wherein the lever is also pivotally attached to the I-beam of one of either the first framing jig or the second framing jig with a pivot pin assembly installed into an intermediate pivot opening of the lever, wherein each of the two ramp assemblies has a plurality of pivoting levers that attach each of the two ramp assemblies to the I-beam of the applicable framing jig, wherein each pivoting lever is attached to the I-beam and to the same vertical flange of the channel that the distal end of the lever is attached, and wherein pivot pin assemblies are used to attached the pivoting lever to the vertical flange and to the I-beam, wherein the offloading system is initiated by depressing the offloading activation button to allow the cylinders to become fluid pressured thereby extending the rod, the rod being attached to the proximate end of the lever with a clevis and clevis pin whereby the extension of the rod pushes the proximate end of the lever toward the rear of the trailer system causing the lever to pivot around the pivot pin assembly installed into the intermediate pivot opening of the lever and causing the distal end of the lever to raise and to move toward the front end of the trailer system thereby lifting the two ramp assemblies upward by the plurality of pivoting levers such that in the fully activated position, each of the two ramp assemblies are held at a position such that the top of the plurality of rolling elements are higher than the upper surface of the I-beams, wherein an offloading deactivator button is depressed to release the fluid pressure from within the cylinder thereby allowing the two ramp assemblies to return to a resting position.

37. The process of using a portable framing fixture to assemble a wall frame comprising the steps of:

placing a set of wall frame components on a portable framing fixture having locator devices to locate the components of the wall frame set, the locator devices including a plurality of spring loaded locator pins;

activating a clamping system to bias all of the set of wall frame components together to locate each of the wall frame components in relation to other wall frame components, the clamping system including at least one rack and pinion;

clamping the set of wall frame components to facilitate assembly of the wall frame;

assembling the set of wall frame components into a wall frame;

deactivating the clamping system to unclamp the assembled wall frame;

activating an offloading system to lift the wall frame from portable framing fixture such that the wall frame may be removed from the portable framing fixture; and removing the wall frame from the offloading system.

38. A portable framing fixture comprising;

means for locating a set of wall frame components, said means including at least a plurality of spring loaded locator pins;

means for clamping the set of wall frame components such that the set of wall frame components are biased toward each other for assembling of the wall frame components, said means for clamping the set of wall frame components including at least one rack and pinion;

means for accessing the set of wall frame components to allow the wall frame components to be assembled into a wall frame;

means for unclamping the assembled wall frame;

means for lifting the assembled wall frame from the means for locating the set of wall frame components; and means for removing the assembled wall frame from the portable framing fixture.

* * * * *